United States Patent Office 2,954,841
Patented Oct. 4, 1960

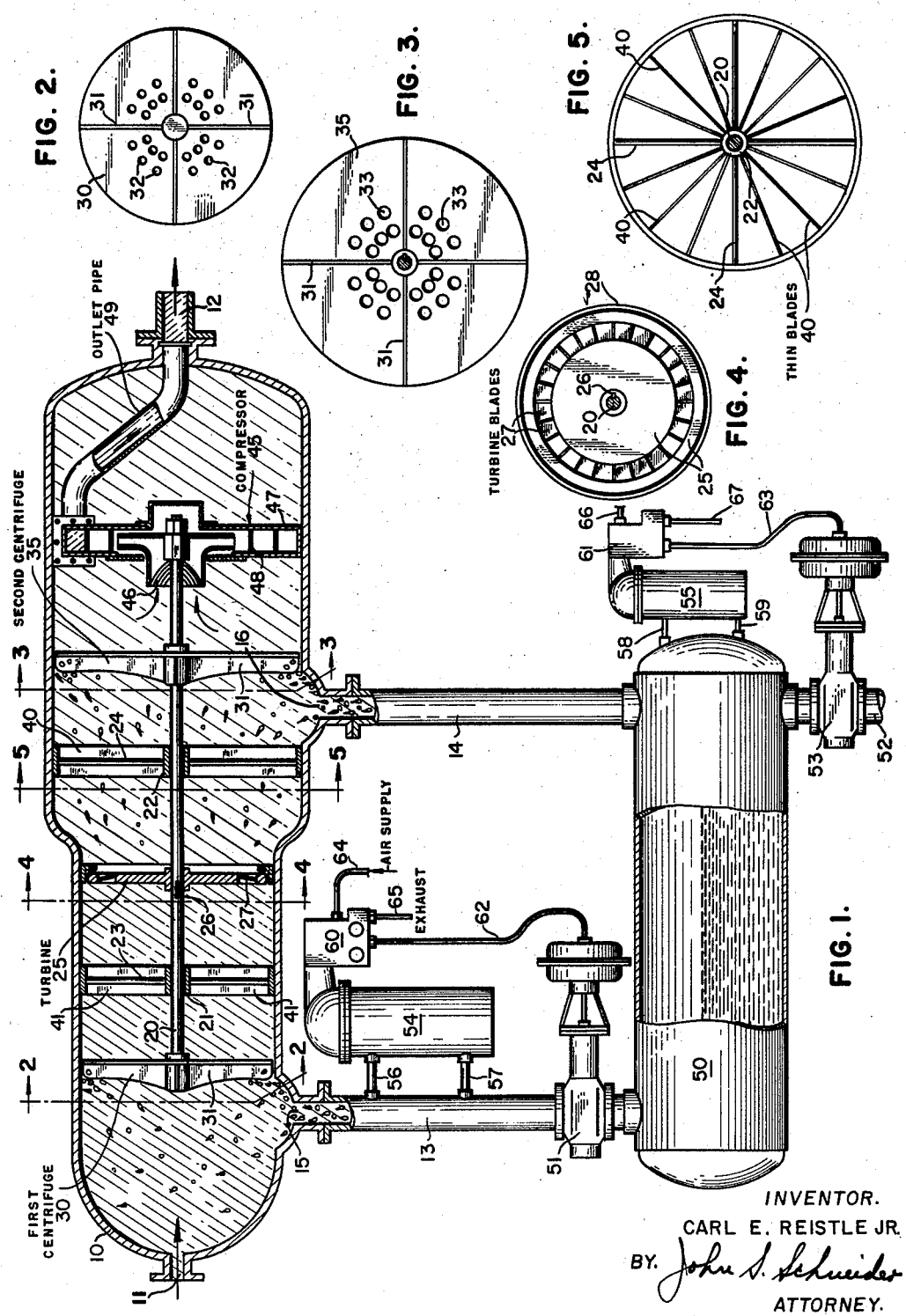

2,954,841

CENTRIFUGAL SEPARATOR

Carl E. Reistle, Jr., Houston, Tex., assignor, by mesne assignments, to Jersey Production Research Company, Tulsa, Okla., a corporation of Delaware Filed Nov. 16, 1956, Ser. No. 622,696

6 Claims. (Cl. 183—77)

This invention concerns an apparatus for the separation of liquids and gases, especially adapted to be employed in the separation of liquid and gaseous hydrocarbons. More particularly, this invention concerns the centrifugal separation of liquids and gases in a fluid stream. In more specific detail this invention concerns centrifugal separation of liquids and gases in a fluid stream wherein mechanical energy utilized to effect the centrifugal separation is derived from pressure reduction of the fluid stream.

The complete separation of liquids and gases by gravity techniques is often difficult or impossible to effect. Also, centrifugal type separation of gases and liquids, wherein the fluid stream is forced to assume a whirling motion without having an external mechanical force act on the fluid stream, for example, when a fluid stream is directed tangentially into a cylindrical container, is not satisfactory in effecting complete separation.

It is an object of this invention, therefore, to effect more complete separation of liquids or gases from a fluid stream by imparting mechanical energy by means of a centrifuge to the fluid stream. The energy utilized by the centrifuge may be derived from the energy of the fluid stream. It is a further object of this invention to utilize the condensation effected by expansion of a gas to obtain additional liquid hydrocrabons from hydrocarbon fluid streams by means of the lowered gas temperature caused by expansion of the gases in the fluid stream. The lowered temperature is obtained by expanding the hydrocarbon gas through a suitable device such as a turbine to make the gas do external work in order to lower the temperature of the gas to a greater degree than is possible with the ordinary "Joule-Thomson" expansion low temperature system.

It is a further object of this invention to absorb the energy imparted by expansion of gas in the turbine in excess of that utilized by the centrifuge(s) and discharge such energy outside the system.

For purposes herein: "fluid" means a gas with entrained or dissolved liquids and with or without entrained solid particles; "liquid" means substantially a liquid phase which may contain small amounts of gas or solids or both; and "gas" means substantially a gaseous phase which may contain small amounts of liquid or solids or both.

Briefly, the apparatus of the invention comprises a separator especially adapted to separate liquid and gaseous components of a hydrocarbon fluid stream which includes a housing formed to provide a fluid inlet and a fluid outlet; a rotatable shaft mounted in the housing; drive means arranged on the shaft and positioned between the inlet and the outlet adapted to rotate the shaft; centrifuge means mounted on the shaft adapted to separate liquids and gases in the inlet fluid stream; and energy absorbing means cooperating with said shaft adapted to absorb energy in excess of that required to drive said centrifuges. Means are also provided for removing the liquid separated from the fluid stream.

Referring briefly to the drawings:

Fig. 1 is a vertical view, partly in section, of the apparatus of my invention;

Fig. 2 is a section taken along lines 2—2 of Fig. 1;

Fig. 3 is a section taken along lines 3—3 of Fig. 1;

Fig. 4 is a section taken along lines 4—4 of Fig. 1; and

Fig. 5 is a section taken along lines 5—5 of Fig. 1.

The degrees of cross-hatching in Fig. 1 represent relative pressures of the fluid stream; the heavier cross-hatching representing relatively higher pressures than the lighter cross-hatching. The spherical and droplet particles in Fig. 1 represent liquid and solid phases.

Referring to the drawings in greater detail in order to achieve a greater understanding of the operation of my invention and wherein identical numerals designate identical parts, the figures disclose a cylindrical vessel or tank 10 formed to provide a relatively narrow inlet opening 11 and a relatively large outlet 12. Two spaced apart liquid discharge conduits 13 and 14 are connected on the lower side of the vessel 10 to two liquid discharge openings 15 and 16 respectively, which may suitably be formed in indented portions of the vessel 10 to facilitate discharge of the liquid, as shown. A rotatable shaft 20 is mounted in vessel 10 and suitably supported on bearings 21 and 22, respectively. The bearings 21 and 22 have mounted thereon supporting struts 23 and 24, respectively, which struts extend to the interior surface of the vessel 10, as shown. Between the supporting struts 23 and 24 is positioned a turbine 25 which includes blades 27. As seen more clearly in Fig. 1, a centrifuge 30 is mounted on one end of shaft 20 for rotation therewith. As seen more clearly in Fig. 2, the centrifuge 30 is provided with a plurality of radially extending blades 31 and perforations 32. A similar centrifuge 35 is positioned downstream of the turbine and is mounted on shaft 20 for rotation therewith. This centrifuge is similarly provided with blades 31 and perforations 33. The perforations 32 and 33 are more or less confined in the central portion of the centrifuges 30 and 35 respectively. As centrifuge 35 is positioned downstream of turbine 25, the pressure of the fluid stream is less than the pressure of the fluid stream upstream of the turbine 25 and centrifuge 30. Hence the perforations 33 in centrifuge 35 are larger than the perforations 32 in centrifuge 30 to accommodate the expanded gas in the fluid stream caused by the pressure drop through the turbine. In conjunction therewith it is to be noted that vessel 10 increases in volume from the inlet to the outlet to accommodate the expanded gas phase.

If desired a plurality of radially extending straightening blades 41 and 40 may be mounted adjacent the struts 23 and 24, respectively. An energy absorber is employed to absorb energy of the turbine in excess of that necessary to drive the centrifuges. This absorber cooperates with shaft 20 in any desired manner. As shown herein, the other end of shaft 20 downstream of turbine 25 is provided with a suitable energy absorbing machine such as the compressor 45 which may be any desired type. Briefly, it may comprise an inlet opening 46 which fluidly communicates with a cylindrical housing 47 which is provided with blades 48. The outer periphery of the housing connects with a conduit 49 which in turn connects to the fluid outlet 12.

As shown in Fig. 1, the liquid discharge opening 15 is positioned adjacent the centrifuge 30; the other liquid discharge opening 16 is positioned adjacent the other centrifuge 35. The two discharge conduits 13 and 14 connect liquid discharge openings 15 and 16, respectively, to a storage vessel or tank 50. Conduit 13 is provided with a valve 51 and the storage vessel 50 is provided with a discharge conduit 52 which is provided with a valve 53. Valves 51 and 53 may suitably be pressure actuated diaphragm type valves. When diaphragm type valves are employed, suitable liquid level control tanks 54 and 55 are connected to conduit 13 and vessel 50, respectively, by means of conduits 56, 57, and 58, 59, respectively. The control mechanism employed may be any of those well known in the art and conventional. A control valving arrangement, as designated at 60 and 61 respectively, to control the liquid level in conduit 13 and vessel 50 respectively, may suitably be employed. The controls 60 and 61 are provided with conduits 62 and 63 connecting, respectively, control 60 with the diaphragm of valve 51 and control 61 with the diaphragm of valve 53. Control 60 is also provided with a suitable source of fluid pressure, not shown, and an exhaust conduit 65. Similarly control 61 is provided with a source of fluid, not shown, and an exhaust 67. Conduits 64 and 66 connect controls 60 and 61, respectively, with the sources of fluid pressure.

When placed in operation the vessel 10 is connected into a flowing stream of gas such as natural gas which may contain liquid hydrocarbons, liquid water, gaseous hydrocarbons and some solid materials. Thus the fluid stream of hydrocarbons enters through opening 11 and impinges upon the centrifuge 30, which imparts to the fluid stream a rapid centrifugal action which forces the liquids and solids having greater density than the gas to the outer periphery of the centrifuge where they strike the walls of the vessel and are drained off through opening 15, conduit 13 and valve 51 into storage vessel 50. The gas, in turn, passes through the perforations 32 in the center of the centrifuge 30 and through the centralizers and straightening blades 41, if they are provided. Blades 41 are adapted to direct the fluid stream flow in a more linear direction. That is, to minimize the rotary motion of the fluid stream imparted to the fluid stream by the centrifuge; however, if it is desired, the blades 41 may be omitted. The fluid stream then passes to the turbine 25 where the pressure of the gas in the fluid stream is reduced upon passing therethrough. The energy imparted by the expansion of the gas in the fluid stream in the turbine produces the energy which rotates the centrifuge 30. Expansion of the gas also results in a substantial reduction in the temperature of the fluid stream. The reduction in temperature causes hydrocarbons and water to condense from the fluid stream leaving the turbine 25. The entire stream of fluid is then directed to the second centrifuge 35. The additional straightening blades 40 adjacent struts 24 may be positioned downstream of the turbine 25 but upstream of the centrifuge 35 in order to minimize the rotation or spiraling of the fluid stream produced by the action of the turbine 25. The second stage centrifuge 35 is also driven by the turbine 25 and this centrifuge similar to the action of centrifuge 30 separates the liquid portion of the fluid stream from the gas portion forcing the liquid portion to the walls of the vessel and through opening 16, conduit 14 and into storage vessel 50. The gas passes through the center of the centrifuge 35 through openings 33 and then enters the suction of the centrifugal compressor 45 through opening 46. The compressor 45 is also driven by the turbine 25. The gases compressed by the compressor 45 pass through conduit 49 to the outlet 12. The compressor herein is primarily directed to absorbing the excess energy of the turbine and the discharge of that energy to outside the system. The two centrifuges 30 and 35 do not absorb all the energy which is imparted by expansion of the gases through the turbine. Hence, in order to reach a lower temperature, it is necessary that the energy removed by the turbine be used to do external work. A centrifugal compressor is shown herein for illustrative purposes only and it is to be understood that any machine which will absorb excess energy of the turbine may be used. For example, a pump, generator, etc. may be used in place of the compressor. However, the compressor is preferred since in addition to absorbing the energy, some of the pressure dissipated in the turbine is recovered.

Any type of valving control for the liquid discharge may be employed. Herein is shown a suitable control mechanism that may be used. In operation, when the liquid level in conduit 13 rises sufficiently to actuate the control in tank 54 via the conduits 56 and 57, a valve in control 60 is actuated which causes a fluid pulse to pass from the conduit 64 through conduit 62 to the diaphragm of valve 51 thereby opening valve 51 which permits the liquid in conduit 13 to pass into the storage vessel 50. When the liquid level has dropped below conduit 57, the control in tank 54 is again actuated which causes the valve in control 60 to close off the source of supply through conduit 64 and exhaust the fluid pressure in conduit 62 to the exhaust 65 thereby closing valve 51. As readily seen, this operation intermittently closes and opens valve 51. The operation of the discharge valve 53 is similar to that described for valve 51. When the liquid level rises in vessel 50, a suitable control in tank 55 is actuated which causes a fluid pressure signal to pass from conduit 66 through conduit 63 to the diaphragm of valve 53 thereby opening valve 53 to discharge liquid contained in storage vessel 50 to discharge conduit 52. When the liquid level in vessel 50 drops to a sufficiently low level the control in tank 55 is again actuated, which actuates a valve in control 61 to cause conduit 63 to exhaust through conduit 67 and cut off the supply through conduit 66 and thereby close valve 53.

As readily seen, it is possible to obtain, via the centrifuge described, a more efficient separation of gas from liquid or solid particles or both in a fluid stream than is possible by other means, such as gravity separation or types of centrifugal separation now in use. Additionally by forcing the fluid stream to do external work, a greater release of energy per increment of pressure drop is obtained than in present low temperature systems which permit lower temperatures to be obtained. The efficiency of separation effected by this device is such that the size of the apparatus required is considerably smaller than the size of separation appartus in present use. Although the housing containing the separating apparatus through which the gas flows is shown herein as cylindrical it is to be understood that any configuration may be employed so long as proper operation is maintained between the high and low pressure stages.

Having fully described the objects, nature and operation of my invention, I claim:

1. A separator for use in separating liquid and gaseous components of a fluid stream comprising a housing forming a path for fluid flow and provided with a fluid inlet and a fluid outlet, turbine means positioned in said fluid flow path, the gas of the fluid stream expanding in passing through the turbine means causing thereby a reduced gas temperature, centrifuge means mechanically connected to said turbine means and arranged in said housing for separating liquid from the fluid stream, said centrifuge means comprising a centrifuge arranged in said flow path upstream of said turbine means and a centrifuge arranged in said flow path downstream of said turbine means, said downstream centrifuge separating liquid from the fluid stream including liquid condensed through the lower temperature caused by expansion of the gas through the turbine means, said turbine means extracting energy from the fluid stream for driving said centrifuge means, and means for absorbing energy extracted from the fluid stream by the turbine means in excess of that utilized for driving the centrifuge means.

2. Apparatus as recited in claim 1 including first and second discharge conduits arranged adjacent the outer peripheries of said upstream and downstream centrifuges, respectively, and a storage vessel connected to said conduits.

3. Apparatus as recited in claim 2 including first valve means positioned in said first conduit adapted to permit and prevent liquid flow between said storage vessel and said housing and a third conduit connected to said storage vessel adapted to discharge liquid from said storage vessel, said third conduit being provided with second valve means adapted to permit and prevent fluid flow from said storage vessel.

4. Apparatus as recited in claim 3 wherein said first and second valve means are provided with liquid level controls, the liquid level in said first conduit controlling actuation of said first valve means and the liquid level in said storage vessel controlling actuation of said second valve means.

5. Apparatus as recited in claim 4 including flow straightening blades arranged between the upstream centrifuge and the turbine means and between the turbine means and the downstream centrifuge, said blades being adapted to tend to direct fluid flow in a linear direction.

6. Apparatus as recited in claim 5 wherein said centrifuges include a plurality of radially extending blades, the surface of each blade extending in the direction of fluid flow.

References Cited in the file of this patent

UNITED STATES PATENTS

| | | |
|---|---|---|
| 945,936 | Gow | Jan. 11, 1910 |
| 1,408,736 | Hernu | Mar. 7, 1922 |
| 2,216,939 | Dodge | Oct. 8, 1940 |
| 2,661,076 | Walker | Dec. 1, 1953 |

FOREIGN PATENTS

| | | |
|---|---|---|
| 22,131 | Great Britain | Nov. 2, 1901 |
| 239,065 | Great Britain | Sept. 3, 1925 |
| 298,226 | Great Britain | Dec. 27, 1928 |
| 324,656 | Great Britain | Jan. 30, 1930 |
| 422,641 | Germany | Dec. 7, 1925 |
| 1,053,943 | France | Oct. 7, 1953 |